US010467916B2

(12) United States Patent
Bishop

(10) Patent No.: US 10,467,916 B2
(45) Date of Patent: Nov. 5, 2019

(54) ASSISTING HUMAN INTERACTION

(75) Inventor: Jonathan Edward Bishop, Mid Glamorgan (GB)

(73) Assignee: Jonathan Edward Bishop, Pontypridd (GB)

( * ) Notice: Subject to any disclaimer, the term of this patent is extended or adjusted under 35 U.S.C. 154(b) by 5 days.

(21) Appl. No.: 13/704,677

(22) PCT Filed: Apr. 26, 2011

(86) PCT No.: PCT/GB2011/050814
§ 371 (c)(1),
(2), (4) Date: Dec. 17, 2012

(87) PCT Pub. No.: WO2011/158010
PCT Pub. Date: Dec. 22, 2011

(65) Prior Publication Data

US 2013/0095460 A1 Apr. 18, 2013

Related U.S. Application Data

(60) Provisional application No. 61/354,851, filed on Jun. 15, 2010.

(51) Int. Cl.
*G09B 5/06* (2006.01)
*G09B 19/00* (2006.01)
*G09B 21/00* (2006.01)

(52) U.S. Cl.
CPC .............. *G09B 5/06* (2013.01); *G09B 19/00* (2013.01); *G09B 21/009* (2013.01)

(58) Field of Classification Search
USPC .......................................... 434/308, 3; 704/3
See application file for complete search history.

(56) References Cited

U.S. PATENT DOCUMENTS

| | | | | |
|---|---|---|---|---|
| 5,543,851 | A * | 8/1996 | Chang | 348/468 |
| 5,810,599 | A * | 9/1998 | Bishop | 434/157 |
| 6,701,162 | B1 | 3/2004 | Everett | |
| 8,380,487 | B2 * | 2/2013 | Bastide et al. | 704/3 |
| 2002/0084902 | A1 * | 7/2002 | Zadrozny et al. | 340/573.1 |
| 2003/0046075 | A1 * | 3/2003 | Stone | 704/257 |
| 2004/0128282 | A1 * | 7/2004 | Kleinberger et al. | 707/3 |
| 2006/0183089 | A1 * | 8/2006 | Gleissner et al. | 434/157 |
| 2006/0285654 | A1 * | 12/2006 | Nesvadba et al. | 379/67.1 |
| 2007/0041370 | A1 * | 2/2007 | Cleveland | 370/352 |
| 2008/0104514 | A1 * | 5/2008 | Kang et al. | 715/719 |
| 2009/0175596 | A1 * | 7/2009 | Hirai | 386/97 |
| 2009/0178010 | A1 * | 7/2009 | Chaudhri | 715/863 |

(Continued)

OTHER PUBLICATIONS

Lamere, et al.; The CMU Sphinx-4 Speech Recognition System; Carnegie Mellon University; United States.

(Continued)

*Primary Examiner* — James B Hull
(74) *Attorney, Agent, or Firm* — King & Schickli, PLLC

(57) ABSTRACT

A method of, and system for, assisting interaction between a user and at least one other human, which includes receiving (202) action data describing at least one action performed by at least one human. The action data is decoded (204) to generate action-meaning data and the action-meaning data is used (206) to generate (208) user response data relating to how a user should respond to the at least one action.

21 Claims, 1 Drawing Sheet

(56) References Cited

U.S. PATENT DOCUMENTS

| | | | | |
|---|---|---|---|---|
| 2010/0198579 | A1* | 8/2010 | Cunnington et al. ............. | 704/3 |
| 2011/0066422 | A1* | 3/2011 | Hybschmann et al. .......... | 704/3 |
| 2011/0255842 | A1* | 10/2011 | Hindle et al. ................. | 386/262 |
| 2012/0114303 | A1* | 5/2012 | Chung et al. ................. | 386/244 |

OTHER PUBLICATIONS

Eyben, et al.; openEAR—Introducing the Munich Open-Source Emotion and Affect Recognition Toolkit; Germany.

Rachuri, et al.; EmotionSense: A Mobile Phones based Adaptive Platform for Experimental Social Psychology Research; United Kingdom.

Spirosloannou, et al.; Robust Feature Detection for Facial Expression Recognition; Greece; 2007.

Bishop; The Role of Multi-Agent Social Networking Systems in Ubiquitous Education Enhancing Peer-Supported Reflective Learning; United Kingdom.

Yoo, et al.; Emotional index measurement method for context-aware service; Elsevier; 2010.

* cited by examiner

ASSISTING HUMAN INTERACTION

FIELD OF THE INVENTION

The present invention relates to assisting interactions between humans.

BACKGROUND OF THE INVENTION

People with emotion recognition difficulties, such as Autism Spectrum Conditions (ASC), have a number of impairments in social situations, which can cause considerable anxiety. For instance, a person with an ASC may tend to literally interpret what others say to them and could interpret the statement "I could die for a cup of tea" as an extreme action to quench thirst. This can cause great difficulties in social situations where such idioms are frequently used, making the individual feel awkward and inadequate.

There are also instances where people unaffected by such conditions may find it desirable to have some automated guidance regarding the actions of other people, e.g. when questioning others in a professional capacity (such as police or lawyers), or when learning new skills or being introduced to new cultures.

SUMMARY OF THE INVENTION

Embodiments of the present invention are intended to address at least some of the abovementioned problems. Embodiments can allow users of the system to better cope with such situations by providing socially contextual information on how they should react, thereby alleviating concerns about the other person's true meanings.

According to a first aspect of the present invention there is provided a method of assisting interaction between a user and at least one other human, the method including:

receiving action data describing at least one action performed by at least one human;

decoding the action data to generate action-meaning data, and using the action-meaning data to generate user response data relating to how a user should respond to the at least one action.

The action data may include audio and/or visual data. For example, the action data may include video (typically including audio) data showing the at least one human performing the at least one action.

The step of decoding the action data may include comparing data in the action data against stored data representing known human actions, and selecting/generating the action-meaning data based on results of the comparison.

The step of decoding the action data may include detecting a facial expression of the at least one human (from the action data) and generating action-meaning relating to the facial expression.

The step of decoding the action data may include detecting explicit and/or implicit cues/information in speech content and/or delivery.

The step of decoding the action data may include detecting voice prosody of speech uttered by the at least one human and generating action-meaning relating to the voice prosody.

The step of decoding the action data may include detecting content of speech uttered by the at least one human and generating action-meaning relating to the speech content.

The method may include receiving data indicating a geographical location of the at least one human. The step of decoding the action data may use the geographical location data to interpret a meaning of a gesture performed by, or speech uttered by, the at least one human. The method may include receiving data indicating a known relationship between the user and the at least one human (e.g. friend or foe status based on previous interactions). The step of decoding the action data may use the relationship data to interpret a meaning of a gesture performed by, or speech uttered by, the at least one human.

The method may include receiving data regarding an appearance of the at least one human (e.g. clothing worn or age). The step of decoding the action data may use the appearance data to interpret a meaning of a gesture performed by, or speed uttered by, the at least one human.

The method may include receiving data regarding a personal characteristic (e.g. gender or sexuality) of the at least one human. The step of decoding the action data may use the personal characteristic data to interpret a meaning of a gesture performed by, or speed uttered by, the at least one human.

The method may receive data (or analyse the action data to generate further data) representing characteristics of the at least one human. The characteristics may be selected from a set including: content of speech uttered by the human; prosody of speed uttered by the human; a facial expression of the human; a location of the human; a known relationship between the human and the user. The method may use the characteristics data to classify the human as one of a set of personality types. The step of decoding the action data may use the classification to interpret a meaning of a gesture performed by, or speed uttered by, the at least one human.

The decoding may include comparing the action data with other action data provided by at least one other user associated with the user The method may include presenting information based on the action-meaning data using a first avatar component and presenting information based on the user response data using a second avatar component. The action-meaning data may be presented as a natural language query by/to the first avatar component.

The user response data may include data intended to assist with persuading the user to accept the response in the user response data.

The method may further include capturing data showing how the user actually responds. The actual response data may be made available to at least one other user associated with the user, e.g. in order to allow the other user(s) to give feedback to the user relating to his/her actual response.

The action data may include data relating to geographical location of the at least one human and/or the user, the geographical location data being used to decode the action data and/or to generate the user response data.

According to yet another aspect of the present invention there is provided a computer program product comprising a computer readable medium, having thereon computer program code means, when the program code is loaded, to make the computer execute methods substantially as described herein.

According to another aspect of the present invention there is provided a system configured to generate data relating to how a user should respond to acts performed by at least one human, the system including:

a device configured to receive action data describing at least one action performed by at least one human;

a device configured to decode the action data to generate action-meaning data, and a device configured to use the action-meaning data to generate user response data relating to how a user should respond to the at least one action.

The device configured to receive action data may include a mobile/hand-held device with video and/or audio capture capabilities. For instance, the device may include a mobile telephone or portable computing device (e.g. Personal Digital Assistant, iPad, laptop, etc) with a video/image recording function.

The device configured to decode the action data and/or the device configured to use the action-meaning data may be remote from the device configured to receive the action data, and the device configured to receive the action data may be configured to transfer the action data (or data based on the action data) to the other device(s). For example, the action data receiving device may transfer the data to a remote server, e.g. via a wireless protocol, including the other device(s).

Client/server implementations of the system can be provided.

According to a further aspect of the present invention there is provided a method of (and/or system for) assisting interaction between a user and at least one other human, the method including:

receiving action data describing at least one action performed by at least one human, and decoding the action data to generate action-meaning data, wherein the decoding includes comparing the action data with other action data provided by at least one other user associated with the user and/or providing user response data the based on data provided by at least one other user associated with the user.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

BRIEF DESCRIPTION OF THE DRAWING FIGURES

The invention may be performed in various ways, and, by way of example only, embodiments thereof will now be described, reference being made to the accompanying drawings in which.

DETAILED DESCRIPTION OF THE INVENTION

Figure 1:
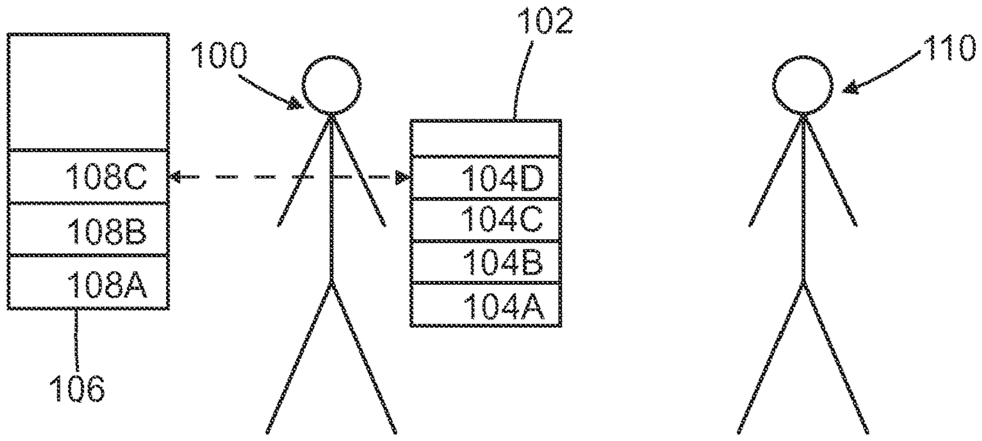
FIG. 1 shows schematically a user with a device for assisting human interaction that is in communication with a server component.

Referring to FIG. 1, a user 100 is shown carrying a portable device 102. The user may be a person with a type of emotion recognition difficulty, or any other person who would benefit from a human interaction assistance system in certain circumstances. The device 102 may include a mobile telephone (e.g. iPhone) or another type of portable computing device (e.g. Personal Digital Assistant, iPad, laptop, etc). In future it is envisaged that nano-technology based implementations mean that the portable user device may effectively at least partially comprise a computing device in the form of an implant in the user's body. The portable device may include a video and/or audio recording/capture device 104A, such as a digital video camera, a processor 104B and a memory 104C. The portable device 102 further includes a communications interface 104D for communicating, e.g. via the internet or any other communications network (preferably wireless, although wired communications links may be used in some cases), with a remote server component 106.

The server component 106 includes at least one computing device having a processor 108A, memory 108B and communications interface 108C. Embodiments of the system described herein use code executing on processors of the user device 102 and server component 106, but it will be appreciated that the functions performed by the various processors may differ, or may be distributed in some other manner, e.g. over more than one remote server/computing device.

Figure 2:
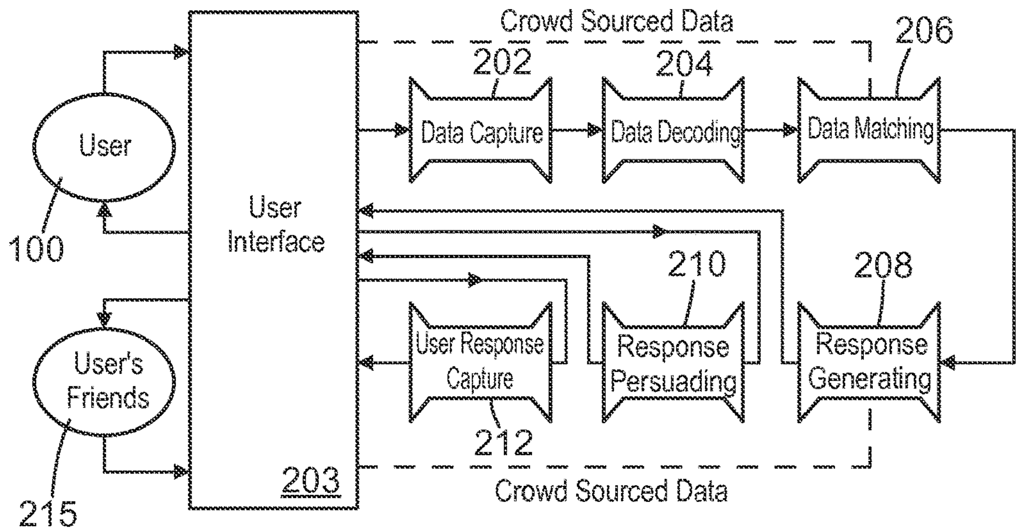
FIG. 2 illustrates schematically functionality provided by the user device and the server.

Referring to FIG. 2, the application code executing on the user device 102 can comprise a data capture function 202. The application can be controlled via a user interface 203 of the user device. The application can use/control the camera (or camera function) 104A of the user device to capture data describing actions performed by at least one other human 110 with whom the user 100 is directly/indirectly interacting, e.g. a person who is in his/her direct vicinity, or a person communicating via a video link or the like. One other human 110 is shown interacting with the user 100 in FIG. 1, but alternative embodiments of the system can be produced to deal with actions performed by more than one human.

It will be understood that other input/data capture systems, such a neural implant or headset that detects EEG or other brain activity could be used. Such embodiments could be configured such that identified sex offenders could only be allowed to have the liberties to free movement and privacy that they need to be denied at present, if they agree have an emotion-recognition implant or headset that runs the "identify and protect" game (see below) and informs the authorities if they are at risk of reoffending.

Data captured by function 202 (such as either all/some of the actual action data, or other data based upon it, e.g. a compressed clip of a video) can be transferred to the server 106 for further processing. One function performed by the server comprises data decoding 204. This function is intended to decode the content and/or meaning of the action data. The function may involve extracting certain types of data from the action data and comparing that against stored data representing known human actions.

The decoding may involve one or more of the following techniques (the skilled person will be capable of producing computer-implemented versions of the principles described in the references):

- detecting a facial expression of the at least one human from the action data (e.g. using a technique such as described in Iaonnou, S. Caridakis, G. Karpouzis, K. & Kollias, S., "Robust feature detection for facial expression recognition", Journal on Image and Video Processing, 2007(2), 5);
- detecting the emotion of the at least one human based on speech content factors attributable to the content of their speech (e.g. using the algorithm of Yoo, H., Kim, M. Y., & Kwon, O. (2011). Emotional index measurement method for context aware service. *Expert Systems with Applications*);

determining the emotion of the at least one human based the affective factors they or a typical person attach to the type of location in which they're currently located, such as happy at home, or sad in the city centre (e.g. using a method based on the work demonstrated in Rachuri, K. K., Musolesi, M., Mascolo, C., Rentfrow, P. J., Longworth, C., & Aucinas, A. (2010). EmotionSense: A mobile phones based adaptive platform for experimental social psychology research. Paper presented at the *Proceedings of the* 12*th ACM International Conference on Ubiquitous Computing,* 281-290);

determine the emotion of at the least one other human based on a designation of the user's relationship with that other person(s). This could use an extended version of the categories of user from the Circle of Friends social networking tool, such as the one described in Bishop, J. (2002). *Development and evaluation of a virtual community*. (BSc(Hons) Multimedia Studies). University of Glamorgan, Pontypridd, UK (submitted via the PeerToPatent website: http://www.peertopatent.org/prior_art/191/detail)

examining voice prosody of speech uttered by the at least one human (e.g. using a technique such as described in Florian Eyben, Martin Wöllmer, Björn Schuller: "openEAR—Introducing the Munich Open-Source Emotion and Affect Recognition Toolkit", in Proc. 4th International HUMAINE Association Conference on Affective Computing and Intelligent Interaction 2009 (ACII 2009), IEEE, Amsterdam, The Netherlands, 10.-12.09.2009), and/or analysing content of speech uttered by the at least one human (e.g. using a technique such as described in Lemere, P, Kwok, P., Gouvea, E., Raj. B, Singh, R., Walker, W. Warmuth, M. & Wolf, P., "The CMU Sphinx-4 Speech Recognition System", IEEE Intl. Conf on Acoustics, Speech and Signal Processing, ICASSP 2003).

The present invention uses methods developed for facial feature detection, such as described in "Robust feature detection for Facial Expression Recognition", Iannou, et. al. which is incorporated herein by reference as noted above.

Iannou provides that the face is first located, so that approximate facial feature locations can be estimated from the head position and rotation. Face roll rotation is estimated and corrected and the head is segmented focusing on the following facial areas: left eye/eyebrow, right eye/eyebrow, nose, and mouth. Each of those areas, called feature-candidate areas, contains the features whose boundaries need to be extracted to detect a facial expression. Inside the corresponding feature-candidate areas, precise feature extraction is performed for each facial feature, that is, eyes, eyebrows, mouth, and nose, using a multi-cue approach, generating a small number of intermediate feature masks. Feature masks for each feature are fused together to produce the final mask for that feature.

The mask fusion process using anthropometric criteria to perform validation and weight assignment on each intermediate mask; each feature's weighted masks are then fused to produce a final mask along with confidence level estimation.

Measurement of facial animation parameters (FAPs) requires the availability of a frame where the subject's expression is found to be neutral. This frame will be called the neutral frame and is manually selected from video sequences to be analyzed or interactively provided to the system when initially brought into a specific user's ownership. The final feature masks are used to extract 19 feature points (FPs). Feature points obtained from each frame are compared to FPs obtained from the neutral frame to estimate facial deformations and produce the facial animation parameters (FAPs). Confidence levels on FAP estimation are derived from the equivalent feature point confidence levels. The FAPs are used along with their confidence levels to provide the facial expression estimation.

The skilled person will appreciate that other types of content/meaning data analysis could be performed, such as head gesture, posture changes, etc. Additional hardware may be provided that is capable of sensing muscle tension, heart-rate, skin conductivity, blood glucose levels or other bodily changes, and other techniques such as those discussed in el Kaliouby, R. Picard, R. Baron-Cohen, S. "Affective Computing and Autism", ANNALS—NEW YORK ACADEMY OF SCIENCES. 2006, VOL 1093, pages 228-248, for example. Such data analysis could allow for automatic detection of Relationship Affect, such as capturing 'hand-clapping' at a low frequency to indicate 'disgust' and therefore determine someone is a 'Foe'. Further examples of such gestures are Maja Pantic, M. Caridakis, G., André, E., Kim, Jonghwa, Karpouzis, K., Kollias, S., "Multimodal Emotion Recognition from Low Level Cues", In: P. Petta, Pelachaud, R. Cowie (Eds.) EMOTION-ORIENTED SYSTEMS: THE HUMAINE HANDBOOK, Springer, pages 115-132. Those skilled in the art can identify further bodily gestures that may be processed to determine relationship status. Further, other types of information may be transferred by from the user/user device for use in the decoding, e.g. information on the geographical location of the user to assist with identifying meaning of words or phrases that may have different meanings in different parts of the world. Other affect recognition techniques can be added to the system to strengthen its accuracy or extendibility, such as algorithms based on '4D systems' like those being researched by Lijun Yin at Binghamton University, or those that can detect 'micro-emotions'. For example, techniques that recognize gestures made or clothing design worn by the other humans can be added to the "facial affect" recognition techniques in order to better determine certain attributes of the other person, e.g. match slang to how it is used by a particular sub-culture recognizable by the type of clothing they wear. Also, the use of micro-emotions can inform the relationship affect recognition algorithm, by identifying whether someone is feeling 'disgust' and therefore a 'Foe', or if they are feeling 'romantic' and therefore a 'Fan'.

Gender and sexuality related recognition techniques may also be added to better inform the speech and dialogue recognition algorithms, and techniques related to interpret intentions in the dialogue of at least one other person relating to, for example, their expressed goals, plans, values, beliefs, interests, or detachments. Such cognitions could inform the dialogue recognition algorithm and possibly a further algorithm of 'absence recognition', which can determine whether someone is in a state of introspection, whether they are disinterested, or busy for example.

The table below presents a list of characters, narrators and avatars (drawn from increasing capital revenue in social networking communities: Building social and economic relationships through avatars and characters. In S. Dasgupta (Ed.), *Social computing: Concepts, methodologies, tools, and applications* (pp. 1987-2004). New York, N.Y.: IGI Global) and synthesised with a range of emotions from various sources which can produce nearly 250,000 affective states through the combination of the identified emotions (or use of a ‘null’ variable if these are missing or switched off). These can be used in the system described herein in order to classify emotions in a more manageable way based on the ecological cognition framework. These can be used as prototypes of different types of people can be useful in helping to deal with various social interactions. For example, Lindsay, P. H., & Norman, D. A. (1977). *Human information processing: Introduction to psychology*. London, UK: Academic Press, suggests that having a stereotype, of for instance, a professor, can aid in identifying the appropriate ways to address them in a particular social context. These can be extended and paired with emotional states in order to produce an algorithm for recommending appropriate behavioural responses.

As reflected in the Table below, the way that a person acts is a function that includes both their setting (the socially constructed interpretation of the setting by an individual) and their individual characteristics. Attributing an intention to a single factor (e.g. the affect from their face and voice) can lead to errors and so it is also important to consider the way their intention changes based on setting and the people they deal with. Embodiments of the system described herein can take into account not only the affects discussed above (e.g. speech/prosody, dialogue, facial expressions), also two or more further factors such as the ones shown in the table below (e.g. location affect, relationship affect). For example, the system can use data representing speech/prosody, dialogue, facial expressions, etc, of the at least one other human and classify them in the most appropriate of the first to third columns below. The system can also obtain information regarding the location of the at least one other human (e.g. using a GPS system or by receiving location information from a mobile device carried by the other person that is configured to interact with the user's system) to classify them in the fourth column. The system can also obtain information regarding any record of their previous interactions with the user (or the user's associates) in order to classify them in the fifth column. The system can them display an emoticon (or any other symbol/text) so that the user can identify the “type” of the other person, which can assist the user with quickly deciding how to respond to the other person.

| Emoticon | Character (Speech Affect) | Narrator (Dialogue Affect) | Avatar (Facial Affects) | Setting (Location Affect) | Territory (Relationship Affect) |
|---|---|---|---|---|---|
| :-# | Lurker (Nervous) | Loner (Afraid, Lonely, Sleepy, Tired) | Stranger (Nervous, Fear) | Wallflower (Nervous) | Forbearer (Afraid, Unsure) |
| ;-) | Chat Room Bob (Intoxicated) | Striver (Bashful, Tense) | Exotic (Possessive, Eager, Hopeful) | Stalker (Intoxicated - Bar or Club) | Fan (Fond, Wanting, Romantic) |
| :-( | Ripper (Sadness) | Rejector (Sad, Distressed, Gloomy) | Pitied (Sadness(*), Depressed, Gloomy, Despairing) | Emo Kid (Sad - City Centre,) | Failure (Sad, Sorry) |
| :-D | Troll (Happiness) | Cynic (Happy) | Humorous (Joy(*), Amused) | Homie (Happy - Residential) | Fellow (Happy, Sneaky) |
| \|-) | Big Man (Boredom) | Sceptic (Bored) | Patriarchal (Bored(*), Critical) | Hipster (Bored, Thinking - School, University) | Frontman (Bored, Thinking, Assertive) |
| :-) | Flirt (Neutral) | Follower (Glad, Pleased) | Orthodox (Calm(*), Please, Serene, Delighted) | Flower Child (Calm, Liked - Countryside, Garden) | Friend (Interested, Liked) |
| 8o\| | Snert (Disgust) | Antagonist (Annoyed) | Pariah (Disgust(*), Irritated) | Juggalo (Bothered, Unfriendly) | Foe (Disgust, Bothered, Unfriendly) |
| 8-\| | Wizard (Cheerful) | Enthusiast (Excited) | Assiduous (Cheerful(*)) | Jared (Cheerful, Excited) | Fixer (Excited) |
| ^o) | Iconoclast (Aggressive) | Detractor (Hateful, Alarmed) | Vanguard (Antagonistic(*), Suspicious) | Beatnik (Disbelieving) | Freethinker (Disbelieving) |
| :@ | E-venger (Anger) | Fascist (Angry) | Dangerous (Anger(*), Contemptuous) | Man Baby (Angry, Hurt - Warehouse, Workplace) | Fighter (Angry, Hurt) |
| :-o | MHBFY Jenny (Surprise) | Pacifist (Astonished) | Timid (Surprise(*), Content, Acceptance, Trusting) | Hippie (Kind, Surprised) | Family (Kind, Surprised) |

It will be appreciated that the table above is exemplary only and variations are possible. The three primary affect recognition techniques (e.g. speech/prosody, dialogue, facial expressions) can be used to explain the meaning of at least 512 affective states to a user via the mobile device. The number of possible affective states decodable is proportional to the number of recognition techniques used and the number of emotions these can detect. One implementation of the system based on the table above has reduced this to a 12 emotional types (including a null emotion for missing or excluded data, etc) using five affect recognition algorithm types to identify nearly 250,000 possible affective states (meanings). The number of possible affective state meanings is unlimited, as new affect recognition algorithms can be added, e.g. using manual coding to add them to the system or by the crowd-sourcing capability, to detect differences based on gender, sexuality or other 'protected characteristic' (UK Equality Act 2010), or measurable individual difference.

The decoding function 204 generates and outputs action-meaning data. The data can be in any suitable format and can be passed on to a data matching function 206. The data matching function 206 can use the output of the decoding function 204 to select data representing a suitable response for the user to perform in response to the other human's actions. Typically, the response data is selected by using the action-meaning data to search through a collection of suitable responses and choose appropriate data that matches, which is typically stored on the server. Data based on the appropriate user response can then be transferred back to the user device 102 and relayed to the user via the interface 203. The data matching function could use the semantic querying approach described in Bishop, J., "The internet for educating individuals with social impairments, Journal of Computer-Assisted Learning, 19(4), 546-556, 2003 (the contents of which are hereby incorporated by reference), for example.

In some embodiments, the store of suitable response data may include data that has been provided by, or created with the assistance of, at least one other user 215 associated with the user 100. Such associated users may be friends of the user who wish to assist him/her with social interaction using the system via a facility such as a website having social networking functionality. Users of existing social networking sites will be familiar with the concept of friends on such networks and the associated users may be linked with the user 100 in a similar manner. An associate user can access at least some of the stored data and perform actions such as: creating data relating to an alternative response to a particular instance, deleting what they feel to be an inappropriate response, and/or creating a new action-response entry in the data store.

Implementations of the system that have the capacity to modify the emotion recognition techniques discussed above can take account of different cultures in which the system is used, for example. Some implementations of the system will have, for instance, the capacity to add information regarding the associate, e.g. the location affects with new locations by geo-coding the speech, facial and dialogue affect data to the specific locality, such as by using information from Google Maps™ or the like. It is possible to tailor the system individually to a specific user. The recommended responses made by the system can be tailored to a specific user by his/her associates suggesting alternative responses to the built-in ones. The system may also have the capacity to associate the responses given in others' speech to the neutral, affirmative and negative response states, which may be subject to approval by moderators or volunteers.

(In the 'counter-insurgence' game below, the system may be tailored to take out of different operational information, such as on the different visual/social/emotional features of combatants, so that it is easier to differentiate an allied partner from an enemy at a checkpoint for instance and recommend the appropriate procedure for dealing with them, based on the best available intelligence from commanders.)

In one embodiment, the data matching function 206 produces data in the form of a natural language query that is passed to a response generating function 208, although it will be appreciated that alternative methods can be used. An onscreen avatar/character may be used to display the natural language query to the user 100 on the device 102. The response generation may be based on AIML (Artificial Intelligence Mark-up Language) that is extendable throughout the system.

The data generated can then be used to present information relating to the selected response to the user via the interface 203. In one embodiment, data relating to the output is transferred to the user device 102 and presented to the user by means of an onscreen avatar/character, which may be different to the avatar used to display the natural language query. The information presented may be, for example, a plain language explanation of an idiom that would be unclear to a person with ASC. For example, if the captured action data included the human using the phrase "Cat got your tongue?" and the analysis of the human's expression and prosody indicated an amused demeanour then the plain-language meaning presented by the avatar could be "The person is being humorous, you are not required to respond".

Thus, embodiments of the system are able to use and translate idioms and may cross culturally explain idioms. For example, if an English speaker from Wales spoke to a French speaking person in Wallonia, who said, 'avoir le bras long' the system could be configured to give the option to show its English equivalent (i.e. has a long arm), or provide a definitional translation (i.e. has influence) in either language. Idioms may also be used in the person type classification technique explained above. This can have the effect of culturally integrating people with emotion recognition difficulties, such as autism, into society. The user may categorise people in the contacts list of their phone (or other smart device), for example, according to the Relationship Affects discussed above. This is novel over known techniques which recommend new contacts simply based on contacts in common, and could, instead, recommend new contacts based on who has common 'Foes' or 'Fighters' in their contacts for example (or any other category). These new contacts can be added to the user's contacts list in order to provide them with support when they are dealing with difficult people who they class as 'Foes' or 'Fighters', for example. Embodiments of the system may also allow users to link their contacts with social media services, such as their blog, Twitter™ or Facebook™. For example, UK citizens could add their local Member of Parliament to their contacts and link through to their speeches and opinions over the Internet.

Figure 3:
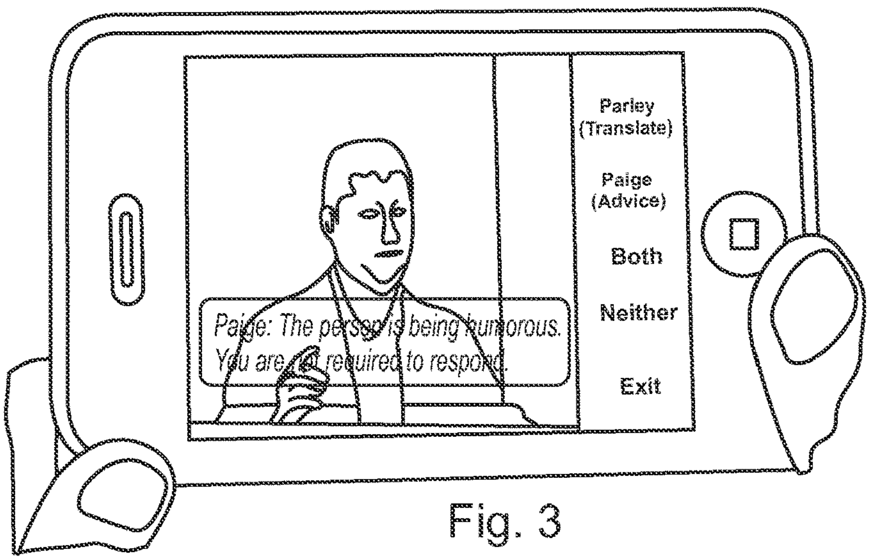
FIG. 3 shows a user device executing an embodiment of the system.

An example screen display (not including an avatar) is shown in FIG. 3. The user is given the option of displaying the plain-language interpretation of the human actions (e.g. using a "Translate" onscreen option) and/or displaying the suggested response (e.g. an "Advice" option). Further information can be provided to the user 100 with regards to what action may be required, giving them greater situation awareness. The example system could be considered to be a mixed reality system somewhere between augmented reality and augmented virtuality in its modes of delivery.

In some embodiments, the response generating function 208 can use data that has been provided by, or created with the assistance of, at least one other user associated with the user 100. For example, an associated user may offer an alternative response to an idiom that may be presented as a response option to the user 100.

In some embodiments, the system may further include a response persuading component 210 that further interacts with the user 100 to convince him/her of the appropriate choice to make. Features of the component may be based on those described in the publication Bishop, J. "The role of multi-agent social networking systems in ubiquitous education: enhancing peer-supported reflective learning", Goh, T., ed. Multiplatform E-Learning Systems and Technologies: Mobile Devices for Ubiquitous ICT-Based Education. Information Science Reference (the contents of which are hereby incorporated by reference). An example response persuasion is if the system's suggested response was The person is being humorous, you are not required to respond' then the user could select this and choose a 'Decline' option instead of 'Accept' or 'Ignore', in which case the system could further respond: 'It is not necessary to respond to a rhetorical statement such as this, which is said to make a point rather than prompt a response'. This may be of particular benefit to users with autism, who may inappropriately respond to rhetorical statements, which may cause anxiety and frustration.

In some embodiments, the system may capture data (function 212) relating to how the user 100 actually responds. For instance, the user-facing camera on the mobile device may be used to audio-visually record the user's response. This data may then be transferred to the server and made available for associated users to review. The associated users may then be able to recommend alternative responses that are fed back into the system for use in providing response suggestions.

Embodiments of the system can be configured with pre-set and user programmable 'Games', which can be detected over time through a 'Data Matching' process (e.g. based on the type of interactions to which the user has been exposed), or may be pre-set (overridden) by the user using the user interface. The games can take the form of either 'multi-actor collaborative', 'single-actor independent' or 'actor-to-chat-bot', although other variations are possible. With regards to the first two types of game, it is possible to implement these over a network, such as a one-to-one video call on the phone, a video-conference between several actors, or a multi-actor collaborative environment such as a classroom or team-work environment. These may be used in real-time settings, or as a way of training professionals at a reduced cost, as they can be played remotely one to one (e.g. single-actor), or within a group/classroom setting (e.g. collaborative games). For example, people could use a one-to-one mobile phone call with their peers, or they and their peers can connect a many-to-one with the instructor. The games can be based on the different 'Emoticons' associated with the grouped affect recognition categories (e.g. [:-)] for Flirt/Follower . . . ).

An example of a single-actor game, 'conversation' [:-)], is as follows:

One example uses the Professor Salton character from the Lindsay & Norman article mentioned above. In this situation, a student, Sue, arrives late to a lecture given by Professor Salton and he berated her. The present system can capture the facial expressions and speech of the speaker. It then matches his face and/or voice to the one in Sue's contacts list (or "Circle of Friends") to establish the relationship affect data, which may determine his relationship affect as 'thinking'. The system may pick up that there is 'anger' in his speech affect, 'anger' in his facial affect, 'anger' in his dialogue, and 'thinking' in his location affect. After the natural language query avatar feeds these to the conversation advice-providing avatar, which would indicate that the speaker feels disrupted. The avatar would then recommend to Sue a neutral response, such as telling her to say nothing, which if she declined would lead to an affirmative response, such as telling her to apologise, which if declined would lead to a negative response, such as telling her to say, 'no need to give me a dressing down'.

Other examples of 'single-actor games' include:

'Decode and decipher': this could help a person with an emotion recognition difficulty, or an acting student for example, recognise the emotions in other people or media containing people (e.g. film, radio, magazines, books, etc.) and provide information on why they may be feeling a particular way and the best way in which to react. They could also use it on themselves through the front facing camera to see how they are portraying themselves, which would be useful for actor training and social skills training.

'Diagnosis' [|-)], 'consult' [8-|]: this could help medical and other professionals diagnose patients/clients problems using the affect information collected and answers to questions prompted. The feedback to the technician could suggest providing reassurances based on their affective states of the patient, such as if they are worried, and allow the technician to know how the client may be perceiving them. It could be used by healthcare professional to identify conditions, bankers and financial advisers to identify customer needs and risk (e.g. through interest and fear emotions), and IT professionals for example, to discover what software features are most important. The game could vary on whether the client is an existing low risk customer (i.e. Friend), or a new customer (i.e. Forbearer) for example.

'Coach' [:-o], 'counsel' [:-o], 'mentor' [8-|]: this could help the user appear to empathise with the other persons' point of view and advise them on or help the find themselves the solutions to their problems.

'Counter-insurgency' [:@]: this could help military personnel differentiate between combatants and civilians based on whether they look threatening or afraid, or the clothes they are wearing for example, and recommend the appropriate action in real-time, using tailored feedback, such as haptic or visual.

'Truth or lie' [:-)],[◯o)], 'innocent or guilty' [:-)],[◯o)], or 'nervous or afraid' [:-#],[:-(]: this could help immigration officials, detectives and courtroom personnel (e.g. juries, magistrates), determine whether someone's speech and facial affect matches up with their dialogue affect, or whether they are under distress. For instance, the system could tell whether a defendant was feeling remorse, or whether a witness was being over-probed by a barrister so that they were becoming upset. Alternatively, it could tell whether an asylum seeker had the fear of someone fleeing persecution, or whether they were being deceptive.

'honourable friend' [|-)], or 'devil's advocate' [:-D]: this could be used by prosecution and defence teams in a court case. The prosecution in a court case could set the defendant as a 'Foe' and the witness as a 'Failure' if they are vulnerable, or 'Frontman'. They could play 'devil's advocate' with the Foe, and 'honourable friend' with the 'Frontman' and 'Failure'. Conversely the defence could set the defendant to one of the Relationship affects dependent on whether they wanted to portray them as a victim or respectable person and play 'honourable friend' with them, and use the 'devil's advocate' game on the witnesses. Using the 'Response Generating' component information could be extracted from Internet services available publicly or restricted sites such as case and law reports, which the 'Response Persuading' component could use to provide information that the prosecution or defence could use to support or oppose what the witness or defendant/claimant are saying. These games could also be used with politicians and their public websites to allow citizens to put them on the spot, or show their support for them, say at 'hustings' or 'town hall' meetings.

'ingratiate' [:-)], and 'seal the deal' [;-)]: this could be used by people working in any negotiation and persuasive role, from international treaty brokers, sales, or even courtship (inc. in combination with consult/diagnosis game), where the strategy used will be different dependent on for example whether the person is a 'Fighter', such as a Terrorist or Hostage Taker, or whether they are a Forbearer, such as someone the user of the system doesn't know but wants to get closer to.

'identify and protect' [◯o)]: this could be used to identify and deal with potential criminals and to prevent victims of crime. A web cam or other input device could be used for example to detect whether someone on a sex offenders register is accessing innocent content but reacting as an 'Exotic' (;-)) which would be more appropriate from adult content. Also, using a CCTV camera to capture at least one other person, the system using the Location affect and facial affect could determine whether someone is likely to be violent, such as whether they look aggressive or intoxicated. The system could then explain to the person manning the CCTV, who may be a volunteer of a Neighbourhood Watch Team for example, the procedure for dealing with it. Using state-of-the-art face recognition systems, the 'data-matching' process could be adapted to compare images on the CCTV with terror suspects or people wanted for immigration or criminal offences, and also those on a register of sex offenders. This is similar to what is currently done at airports—However it could be manned by a community volunteer than a costly professional as the system would explain the procedure to take following identification.

'human resource or inhuman miscreant': this could be used by recruiters and personnel staff to determine whether someone is likely to fit in with their organisation's profile to increase benefit or end up being a costly error, or to use with existing staff to determine attitude for promotion/disciplinary action, for example. Like 'identify and protect' it could be used to see whether someone is a potential asset or threat, such as in military/peace-making operations where recruiting civilians can be a matter of life or death.

Collaborative games, are agreed on by each person in advance, are different from single-agent games where they may each have different games in operation. Examples include:

'consensus' [:-o], [:-)]: this is a multi-actor version the single-actor game, 'honourable friend'. In this people see a 'win-win' outcome on the basis of integrated bargaining.

'status-quo' [8o|][|-)]: this is a multi-actor game equivalent of 'devil's advocate', where people seek to maintain the status quo.

'innovation' [8-|], [◯o)]: this is a multi-actor game where people seek to find new solutions, but where conflicting ideas and ideologies need to be managed. By integrating with each side's social media contributions, people can be helped over their difficulty of not having full access to their cognitions at anyone point in time.

'courtship' [:-)], [;-)]: this is a multi-actor game where people seek to get to know each other better, by giving out conflicting signs of interest in a playful way. This can be enhanced using information for social networking and other sites.

'one-upmanship' [|-)], [8o|]: this is a multi-actor game where one side tries to prove they are 'better' than the other. Using information from the internet to contradict one or the other keeps the game flowing.

'agony aunt' [:-o], [:-(]: This is a multi-actor game where a vulnerable person seeks advice from a caring person—the vulnerable person may not be seeking an answer as there would be in 'innovation', but just wants to know someone understands—they may reject every suggestion but like the attention.'newbie' [:-#], [8o|], [:-)], [:-D]: This is a multi-actor game where a person unfamiliar with others try to become part of the community. Through engaging in 'teasing' conflicts and well as 'friendly' and 'empathetic' discourse they become a greater part of the community.

'mediumship' [:-o] and 'mindreading' [:-)], [:-D]: This multi-actor game, where one actor is seeking to prove to the second actor that they can using 'supernatural powers' be able to 'read their mind' or 'bring through' an ancestor who has 'passed over' to 'the other side'. This may be to help with bereavement or for entertainment purposes. The game uses general phraseology that could apply to anyone, referred to as 'Barnum statements' as well as information associated with the second actor retrieved from online sources, such as genealogy databases and social media. This is used in combination with their detected emotional reactions to advise on the appropriate presentation of that information by the first actor to the second. This may result in the second actor doubting conventional logic and wondering whether the first actor has a direct connection to their mind or 'the other side'. The recommended dialogue in the game can include that similar the 'agony aunt' game to portray empathy or more friendly mischievous dialogue, as with 'newbie'.

Actor-to-Chatbot games allow the user to develop greater awareness.

Examples include:

'Flirtatious Florence': This game would allow the user to practice small-talk and informal conversation. The avatars would give feedback as to how they 'feel' based on how actual humans may feel.

'Highbrow Hypatia': This game would allow the user to practice their skills at logic and reasoning. The avatar would give feedback as to whether to user is being too arrogant, for example.

'Aunt Jenny': This game would allow the user to learn to manage their emotions, such as if they have autism, or post-traumatic stress disorder (e.g. from military engagements).

'Creative Colette': This game would allow the user to discuss their ideas, which if they are someone with autism they may find it difficult to contain and discuss them at inappropriate moments.

'Sturdy Artemisia': This game helps the user develop survival skills, independent living skills, or get a greater awareness of other bodily/anatomical issues. For those in the military it could provide the 'just-in-time' advice they need, should they get injured or need some other fact. Similarly, for medical practitioners it will discuss the most appropriate medication and dose for their patient. For a person with a disability that affects independent living, this game could allow them to know what to do in any situation where they could put their health in jeopardy, or where the user is concerned about a medical symptom, or needs someone to speak to in order to satisfy or alleviate a bodily need.

The use of Games and the Affect Recognition features of the system could result in reduced costs (including opportunity cost) in training and service delivery of the professions that would usually use them, meaning elite professions that may at present require a university education, may only require basic college training or training on the job. For example, using the 'diagnosis' game, the technical skill required to diagnose a patient would be significantly reduced. It may only require training of 9 months at minimum to train a technician to use the system in a clinical setting, or at maximum a nursing qualification, as the system could be able to provide instructions through the advice agent on what to ask the patient, and how to inspect them). In the case of the former, this could mean that the costs to provide a General Practitioner would be cut by up to 90% in terms of salary and training that would be no longer required. The 'counter-insurgency' game could significantly reduce the number of civilian deaths in military operations, and speed up training, where service personnel would be able to complete training exercises on this game and then reflect on it online with their peers in their Circle of Friends, who could suggest how they could improve their performance. The 'innocent or guilty' and associated games, could mean that 'gut instinct' or 'prejudice' could be illuminated from interviews/cross-examinations, so that instead of decisions on asylum seekers or defendants being taken by potentially xenophobic officials or bigoted juries, they are based on the impartial and culturally sensitive recommendations of the system, which could be certified by an expert in the same way photographs in speed cameras are by an official. The possible usage of identifying miscreants on CCTV and the system assisting with volunteer with the reporting procedure, would mean that a so-called 'Sarah law' would only come into force when the suspect sex offender was spotted in a public space used by children or others they are likely to abuse, and the need to keep terror suspects under house arrest would be unnecessary, as those volunteers manning extensive CCTV booths using the system would know when they are in suspect areas.

Embodiments of the present system comprise a server-side driven mobile phone/device application that gives people with emotion recognition difficulties the augmented ability to take part in social situations they would normally find difficult or confusing. The embodiments allow people with such difficulties to receive information substantially in real-time via video-based devices such as headsets or mobile phones, which means they are able to make decisions using their systemising capabilities in situations where individuals with a high Empathising Quotient would have little difficulty.

The invention claimed is:

1. A computer-implemented method of assisting interaction between a user with social orientation impairments and at least one human, said interaction between said user and said at least one human occurring face-to-face within a same physical space, the method including:

receiving, via a user interface of a portable computing device having a video and audio recording/capture device, a first processor and a memory database, action electronic data representative of at least one action performed by the at least one human;

transferring said action electronic data within said computing device from said user interface to a remote server component having a second processor;

decoding, using the second processor having a data matching module, the action electronic data to generate action-meaning data, wherein the step of decoding comprises extracting, using a speech or image processing module within the second processor, at least a subset of the action electronic data, said subset of the action electronic data being image data representative of an emotive or behavioural aspect of the at least one action performed by the at least one human, locating a face within the image data, segmenting the face according to pre-determined feature-candidate areas, each pre-determined feature-candidate area being representative of a facial feature of the at least one human, extracting facial feature data for each pre-determined feature-candidate area and generating a plurality of intermediate feature masks, fusing each of the plurality of intermediate feature masks to produce a final mask data set representative of a whole face of the at least one human, comparing the final mask data set against a neutral frame data set and calculating discrepancies between the final mask data set and the neutral frame data set to represent deformations of each pre-determined feature-candidate area, provide facial expression estimation data, comparing said facial expression estimation data against stored data in the memory database representative of known emotive or behavioural actions to identify a match, and generating action-meaning electronic data corresponding to a matching emotive or behavioural action;

using the data matching module to generate, using the action-meaning electronic data, response electronic data representative of how the user with social orientation impairments should respond to the at least one action performed by the at least one human, wherein the data matching module is configured to search, using said action-meaning electronic data, a database storing a plurality of action-meaning/response combination electronic data to identify a match and generate said response electronic data based on said match;

providing said response electronic data to said computing device;

relaying to the user with social orientation impairments, via said user interface, the response electronic data;

wherein said second processor further includes a response persuading component, said response persuading component receiving data representative of whether or not the user with social orientation impairments proposes to respond or has responded in accordance with said response electronic data and, if not, generating further response electronic data representative of why the user should respond in a manner indicated and/or a potential result of the user failing to respond in the manner indicated; and capturing, via the user interface, electronic data representative of how the user actually responds.

2. A method according to claim 1, wherein the step of decoding the action electronic data includes comparing, using the second processor, electronic data in the action electronic data against stored electronic data representative of known human actions, and selecting, by the processor, the action-meaning electronic data based on results of the comparison.

3. A method according to claim 2, wherein the step of decoding the action electronic data further includes using the second processor to detect explicit or implicit cues/information in speech content or delivery of the at least one human represented in the action electronic data.

4. A method according to claim 2, wherein the step of decoding the action electronic data further includes using the second processor to detect voice prosody of speech uttered by the at least one human represented in the action electronic data and generating action-meaning electronic data relating to the voice prosody.

5. A method according to claim 2, wherein the step of decoding the action electronic data further includes using the second processor to detect content of speech uttered by the at least one human represented in the action electronic data and generating action-meaning electronic data relating to the speech content.

6. A method according to claim 1, further including receiving, via the user interface, electronic data indicating a geographical location of the at least one human, the step of decoding the action electronic data by the second processor further including using the geographical location data to interpret a meaning of a gesture performed by, or speech uttered by, the at least one human represented in the action electronic data.

7. A method according to claim 1, further including receiving, via the user interface, electronic data indicating a known relationship between the user and the at least one human, the step of decoding the action electronic data by the second processor further including using the relationship data to interpret a meaning of a gesture performed by, or speech uttered by, the at least one human represented in the action electronic data.

8. A method according to claim 1, further including receiving, via the user interface, electronic data regarding an appearance of the at least one human, the step of decoding the action data by the second processor further including using the appearance electronic data to interpret a meaning of a gesture performed by, or speed uttered by, the at least one human represented in the action electronic data.

9. A method according to claim 1, further including receiving, via the user interface, electronic data regarding a personal characteristic of the at least one human, the step of decoding the action electronic data by the second processor further including using the personal characteristic data to interpret a meaning of a gesture performed by, or speed uttered by, the at least one human represented in the action electronic data.

10. A method according to claim 1, including receiving, via the user interface, electronic data, or analyzing, by the second processor, the action data to generate further data, representing characteristics of the at least one human, the characteristics being selected from a set including: content of speech uttered by the human; prosody of speed uttered by the human; a location of the human; a known relationship between the human and the user.

11. A method according to claim 10, including using the characteristics electronic data to classify the human as one of a set of personality types.

12. A method according to claim 11, wherein the step of decoding the action electronic data, further includes the second processor using the classification to interpret a meaning of a gesture performed by, or speed uttered by, the at least one human.

13. A method according to claim 1, wherein the step of decoding the action electronic data includes the second processor comparing the action electronic data with other action electronic data provided by at least one other user associated with the user.

14. A method according to claim 1, wherein the second processor generates data representative of first and second avatar components, the method includes presenting, via the user interface, information based on the action-meaning electronic data using the first avatar component and presenting, via said user interface, information based on the user response electronic data using the second avatar component.

15. A method according to claim 14, wherein the action-meaning data is presented as a natural language query by the first avatar component.

16. A method according to claim 1, wherein the actual response electronic data is made available to at least one other user associated with the user in order to allow the at least one other user to give feedback to the user regarding his/her actual response.

17. A computer program product comprising a computer readable medium, having thereon computer program code, which when the computer program code is executed causes the computer to perform the following steps for assisting interaction between a user with social orientation impairments and at least one human occurring face-to-face within a same physical space:

receiving, via a user interface of a computing device having a processor, action electronic data representative of at least one action performed by the at least one human;

transferring said action electronic data within said computing device from said user interface to the processor; and decoding, using the processor, the action electronic data to generate action-meaning data, wherein the decoding includes locating a face within an image data, segmenting the face according to pre-determined feature-candidate areas, each pre-determined feature-candidate area being representative of a facial feature of the at least one human, extracting facial feature data for each pre-determined feature-candidate area and generating a plurality of intermediate feature masks, fusing each of the plurality of intermediate feature masks to produce a final mask data set representative of a whole face of the at least one human, comparing the final mask data set against a neutral frame data set and calculating discrepancies between the final mask data set and the neutral frame data set to represent deformations of each pre-determined feature-candidate area, provide facial expression estimation data, wherein the processor uses the action-meaning data to generate user response electronic data representative of how the user with social orientation impairments should respond to the at least one action and assists the user to respond in a manner of which the user response electronic data is representative, wherein the processor includes a response persuading component receiving data representative of whether or not the user with social orientation impairments proposes to respond or has responded in accordance with said user response electronic data and, if not, generate further user response electronic data persuading the user with social orientation impairments to response in the manner indicated and/or a potential result of the user with social orientation impairments failing to respond in the manner indicated, and wherein the user interface captures electronic data representative of how the user actually responds; and transferring the electronic data representative of how the user actually responds to a remote server for further review.

18. A system configured to assist interaction between a user with social orientation impairments and at least one other human, said interaction between said user and said at least one other human occurring face-to-face in a same physical space, the system including:

a first device having a user interface configured to receive action data describing at least one action performed by the at least one human a second device configured to decode the action data to generate action-meaning data by: (i) extracting at least a subset of the action data, said subset of the action data being representative of an emotive or behavioural aspect of the at least one action performed by the at least one human; (ii) locating a face within an image data; (iii) segmenting the face according to pre-determined feature-candidate areas, each pre-determined feature-candidate area being representative of a facial feature of the at least one human; (iv) extracting facial feature data for each pre-determined feature-candidate area and generating a plurality of intermediate feature masks; (v) fusing each of the plurality of intermediate feature masks to produce a final mask data set representative of a whole face of the at least one human; (vi) comparing the final mask data set against a neutral frame data set and calculating discrepancies between the final mask data set and the neutral frame data set to represent deformations of each pre-determined feature-candidate area; and (vii) providing facial expression estimation data, said second device having a data matching module comparing said facial expression estimation data against stored data representative of known emotive or behavioural actions to identify a match and generating action-meaning electronic data corresponding to the match; and a third device configured to use the action-meaning electronic data to generate user response data relating to how the user with social orientation impairments should respond to the at least one action, the response data configured to assist the user to respond in a manner of which said response data is representative, said third device having a response persuading component receiving data representative of whether or not the user with social orientation impairments responds with the generated user response data and, if not, said response persuading component generates further user response data persuading the user with social orientation impairments to respond in the manner of which said response data is representative, whereby the first device captures data representative of how the user actually responds and transfers said data representative of how the user actually responds to the second or third device.

19. A system according to claim 18, wherein the first device configured to receive action data includes a mobile/hand-held device with video or audio capture capabilities.

20. A system according to claim 19, wherein the first device configured to receive action data comprises a mobile telephone or portable computing device with a video/audio recording facility.

21. A system according to claim 18, wherein the second device configured to decode the action data or the third device configured to use the action-meaning data is remote from the first device configured to receive the action data, and the first device configured to receive the action data is configured to transfer the action data, or data based on the action data, to the other devices.

* * * * *